United States Patent

[11] 3,549,793

[72] Inventor John D. Ross
Dollard des Ormeaux, Quebec, Canada

[21] Appl. No. 724,393
[22] Filed Apr. 26, 1968
[45] Patented Dec. 22, 1970

[73] Assignee Central Dynamics, Ltd.
Montreal, Quebec, Canada
a body corporate and Politic

[54] TELEVISION TRANSMITTING SYSTEM UTILIZING IMPROVED MEANS FOR ESTABLISHING PREDETERMINED PHASE RELATIONSHIPS BETWEEN VARIOUS SIGNALS WITHIN THE SYSTEM
9 Claims, 5 Drawing Figs.

[52] U.S. Cl. 178/5.4
[51] Int. Cl. H04n 5/44
[50] Field of Search 178/5.4, 6F&M, 69.5CB, 69.5DC, 5.4CR

[56] References Cited

UNITED STATES PATENTS

| | | | |
|---|---|---|---|
| 3,100,816 | 8/1963 | Coleman, Jr. et al. | 178/5.4CR |
| 3,342,931 | 9/1967 | Yunde | 178/5.4CR |
| 3,384,707 | 5/1968 | Bopp et al. | 178/69.5D.C. |
| 3,392,231 | 7/1968 | Schonfelder | 178/69.5DC |
| 3,420,951 | 1/1969 | Gunther | 178/69.5TU |
| 3,202,769 | 8/1965 | Coleman, Jr. | 178/69.5DC |

*Primary Examiner*—Robert L. Griffin
*Assistant Examiner*—Donald E. Stout
*Attorney*—Addams & Ferguson

ABSTRACT: Disclosed is a television system utilizing improved means for establishing predetermined phase relationships between the color burst signals and/or synchronizing signals of two composite or noncomposite color signals. Typically, these two signals occur at the input of an additive mixer or special effects circuit where the phases of the color burst signals must be essentially equal. The additive mixer or special effects circuit is usually connected to two output lines of a switching matrix. In a first embodiment of the invention, phase adjustment can be made at all inputs to the switching matrix whereby the phase adjustment is effectuated on all output lines of the matrix including the two which are connected to the additive mixer, for example. In a second embodiment only two phase adjusters are respectively connected to the two additive mixer inputs. In this second embodiment, no phase adjustment occurs at the inputs to the switching matrix. In a third embodiment, which is a modification of the second embodiment, only one phase adjuster is employed and it is connected to one of the inputs of the additive mixer. The phase of the sync and/or color burst signals at this input is adjusted in relation to the phase of the corresponding signal at the other input to the mixer. A phase adjuster which rotates the phase of the color subcarrier signal of a picture signal is also disclosed, this phase adjuster dividing the picture signal into its chrominance and luminance components. The separated chrominance signal has its phase adjusted by different methods which are disclosed. The phase adjusted chrominance signal is then recombined with the separated luminance signal to form the desired composite color signal with phase adjusted color subcarrier.

PATENTED DEC 22 1970 3,549,793

INVENTOR
JOHN D. ROSS
By Addams & Ferguson
ATTORNEYS

PATENTED DEC 22 1970

3,549,793

SHEET 3 OF 3

TELEVISION TRANSMITTING SYSTEM UTILIZING IMPROVED MEANS FOR ESTABLISHING PREDETERMINED PHASE RELATIONSHIPS BETWEEN VARIOUS SIGNALS WITHIN THE SYSTEM

BACKGROUND OF THE INVENTION

This invention relates to a television system for establishing predetermined phase relationships between composite or noncomposite picture signals occurring in the system. Further, this invention relates to phase adjusters utilizing closed-loop correction techniques to effectuate desired phase relationships between the above mentioned picture signals.

Heretofore, whenever two picture signals had to be brought in phase or in any other predetermined phase relationship it was necessary to employ what may be termed as open-loop techniques—that is, if the color burst signal, for example, of a picture signal A had to be in phase with the color burst signal of picture signal B at some point (for example, at the input of a special effects circuit) it has been necessary in the prior art systems to physically adjust the length of the two paths respectively provided for signals A and B in order that the desired phase relationship was established. Alternatively, another open-loop technique has been available in prior art systems where the phase of a particular color subcarrier signal (for example, the one associated with picture signal A) could be adjusted at the camera control associated with signal A.

The main disadvantage of the foregoing prior art systems lie in the fact that no automatic establishment of desired phase relationships can be effectuated. Thus, the practical difficulty arises of establishing desired phase relationships between two or more picture signals at multiple destinations simultaneously. Thus, in these prior art systems, a large amount of cable length and adjustment occurs and in a fairly complex system, the situation can readily get out of hand.

SUMMARY OF THE INVENTION

Thus, it is a primary object of this invention to provide in a television system automatic phase adjusting circuitry utilizing close-loop techniques to effectuate desired phase relationships between picture signals in the system.

It is a further object of this invention to provide improved circuitry of the above type wherein desired phase relationships between picture signals can be readily established at multiple destinations simultaneously.

It is a further object of this invention to provide improved phase adjusting circuitry for adjusting the phase of the chrominance component of a composite or noncomposite color signal.

Other objects and advantages of this invention will become apparent upon reading the appended claims in conjunction with the following detailed description and the attached drawing.

DETAILED DESCRIPTION OF PREFERRED EMBODIMENTS OF THE INVENTION

Figures 1, 2:
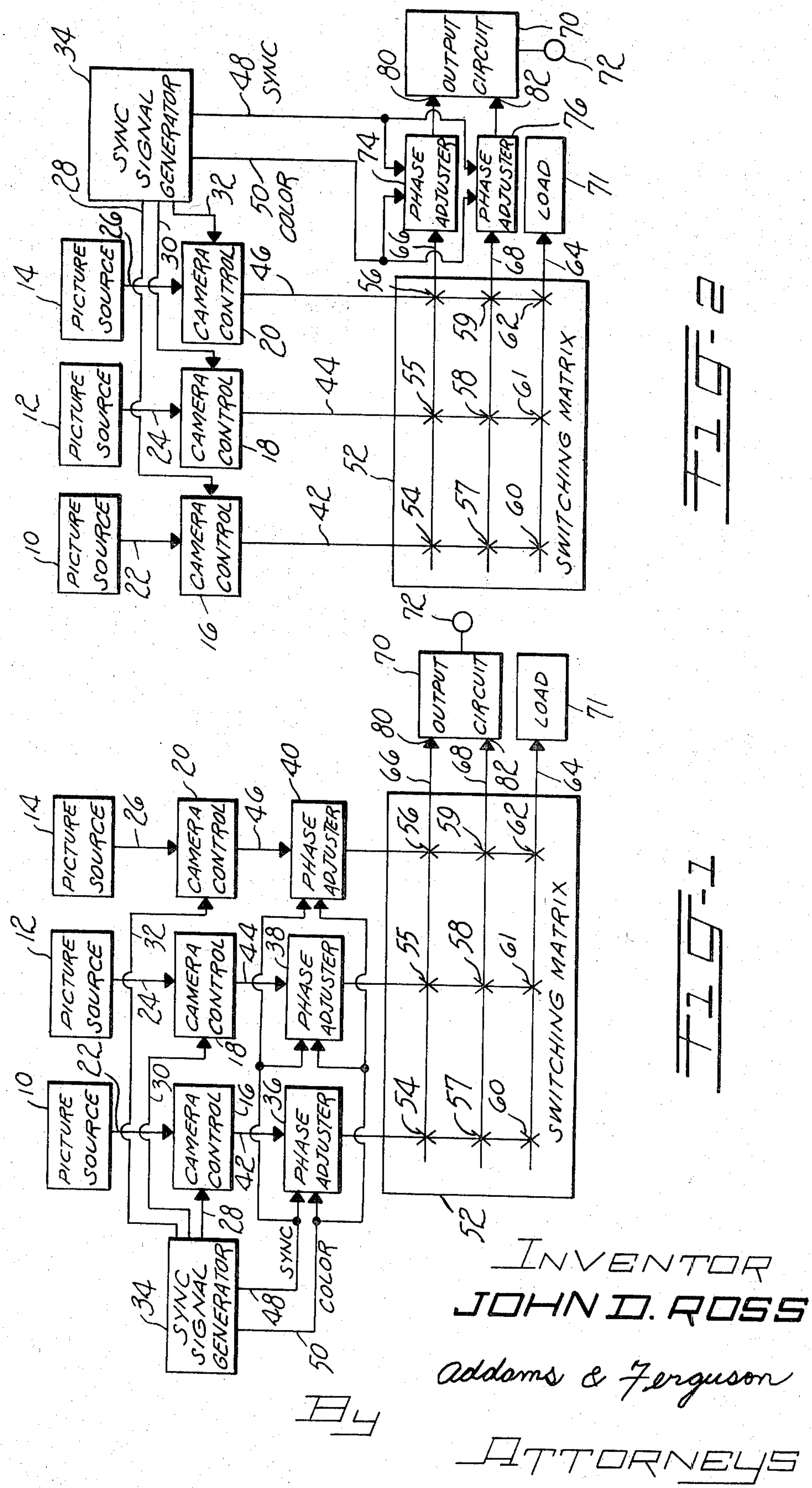
FIG. 1 is a block diagram of a first illustrative embodiment of a television system in accordance with the invention.
FIG. 2 is a block diagram of a second illustrative embodiment of a television system in accordance with the invention.

In all FIGS. of the drawing, like reference numerals refer to like elements or circuits.

Referring to FIG. 1, there is shown a first embodiment of the invention. In particular, a system is illustrated comprising three picture sources 10—14 which may be television cameras or the like. The sources 10—14 are respectively connected to camera controls 16—20 via lines 22—26. Also connected to the camera controls 16—20 are timing signals over lines 28—32 respectively. These timing signals are generated by synchronizing signal generator 34 which may be of conventional design. The composite output signals from camera controls 16—20 are respectively connected to phase adjusters 36—40 via lines 42—46.

Also applied to phase adjusters 36—40 over lines 48 and 50 are sync and color subcarrier signals respectively. These signals are employed by the phase adjuster to effectuate a desired phase adjustment of the signals on line 42—46 in a manner which will be described in more detail hereinafter. The phase adjusted signals are applied to a switching matrix 52 which includes a plurality of switching points 54—62. Output line 64 is connected to load 71, which may be any device suitable for use within a television system. The output lines 66 and 68 are connected to an output circuit 70. For purposes of illustration, only three input and three output lines are shown in switching matrix 52.

The output circuit 70 may comprise either (1) a mixing circuit wherein the input signals may be combined in any proportion and applied to output terminal 72 or (2) a special effects circuit wherein the input signals thereto are alternately switched to output terminal 72 in a predetermined manner to effect a desired special effects video signal. In the above two circuits the color burst signals of the two inputs must be essentially in phase or else distortion will result. Generally, output circuit 70 is any circuit wherein a predetermined phase relationship must exist between either the chrominance signals of the two color video signals applied thereto or the synchronizing pulses of these two video signals or both.

Generally, the lengths of the lines connecting the camera controls 16—20 to the switching matrix 52 vary. Thus, heretofore with prior art devices, the relative phase of the signals applied to line 66 and 68 would vary depending on which pair of input lines 42—46 were connected to output circuit 70. Phase adjustment at lines 66 and 68 was effected by switching in different fixed length delay lines to bring about the desired phase relationships between the signals applied to output circuit 70.

With the embodiment of FIG. 1, the need for fixed length delay lines is eliminated thereby simplifying the phase adjustment problem. Further, because phase adjusters are provided at each of the input lines to switching matrix 52 the phases of the signals appearing at these lines can be adjusted for whatever purpose might be required by the overall system.

Before describing in detail the phase adjusters 36—40, other system arrangements will be described in reference to FIGS. 2 and 3. Referring to fig 2, it is noted that the phase adjusters 74 and 76 are inserted in output lines 66 and 68 rather than in input lines 42—46 as shown in FIG. 1. The embodiment in FIG. 2 is a simplification of that of FIG. 1 in that only two phase adjusters are provided and these are provided only at the inputs of output circuit 70. Since the number of inputs to switching matrix 52 is at typically 12 or 18, it can be seen that the simplification of FIG. 2 will result in substantial economies with respect to the embodiment of FIG. 1. However, the system of FIG. 1 is more flexible than that of FIG. 2. Thus, in FIG. 1 phase adjustment can be obtained for the signal occurring on output line 64 whereas such is not the case for the embodiment of FIG. 2.

Phase adjustment between the signals occurring at the input terminals 80 and 82 of output circuit 70 is accomplished in accordance with the phase of the locally generated sync and color subcarrier signals generated on lines 48 and 50 from synchronizing generator 44. The manner for effecting this will be described in more detail hereinafter.

Figures 3, 4:
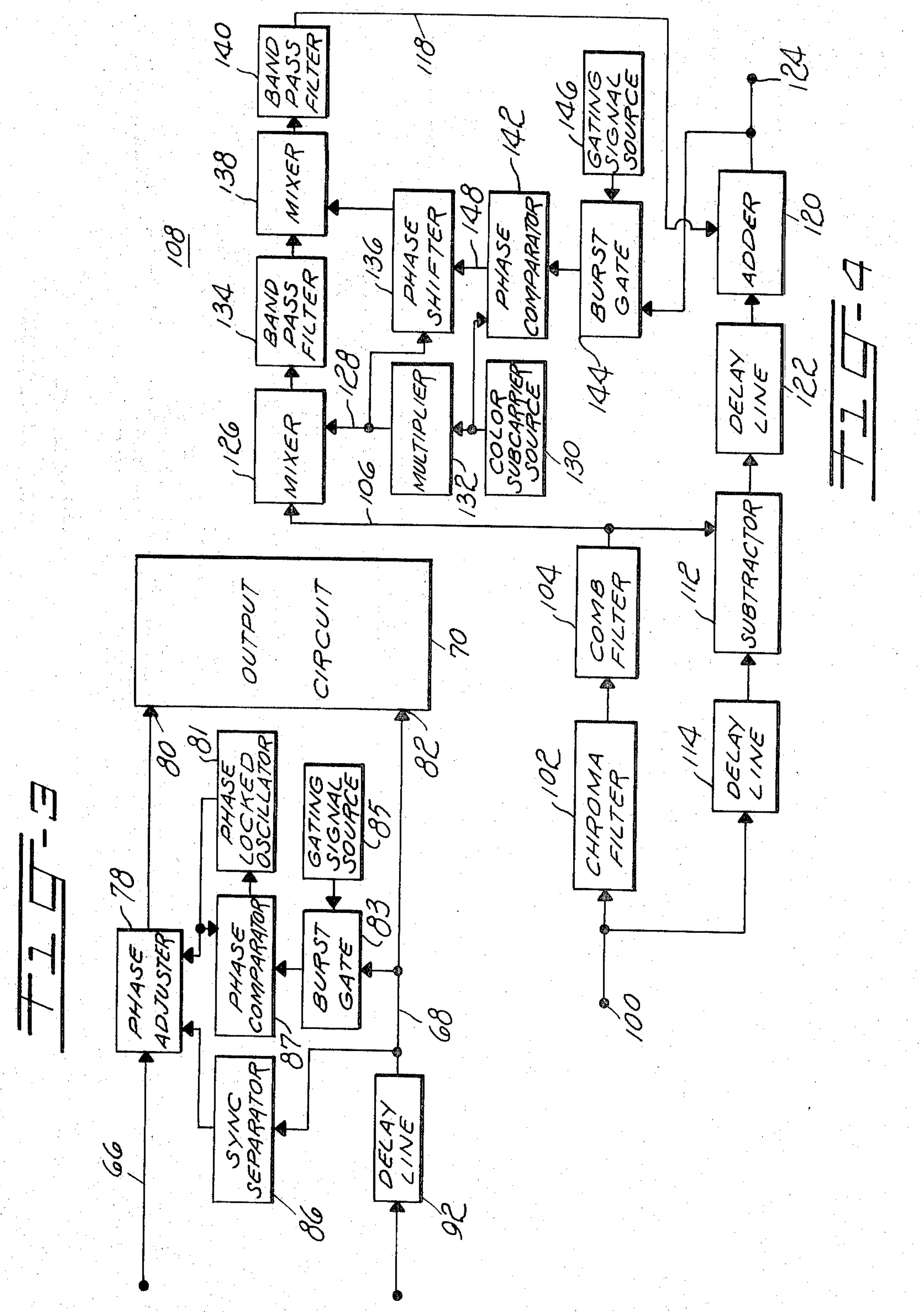
FIG. 3 is a block diagram of a third illustrative embodiment, which is a modification of the FIG. 2 embodiment.
FIG. 4 is a block diagram of a first illustrative embodiment of a phase adjuster in accordance with the invention.

A modification of the FIG. 2 embodiment is illustrated in FIG. 3. The phase adjusters 74 and 76 of FIG. 2 are replaced by a single phase adjuster 78. The sync signal required for phase adjuster 78 is derived from sync separator 86 and applied over line 88. The color subcarrier signal is derived from color subcarrier oscillator 81, which is phase locked to the burst signal extracted from the picture signal occurring on line 68. The burst signal is extracted by burst gate 83 by application thereto of an appropriately timed signal from source 85. There are different ways to generate the source 85 signal and these are known to those of ordinary skill in this art. Phase comparator 87 compares the phases of the signals applied thereto to insure that the phase of the oscillator signal follows that of the color burst. Delay 92 is inserted in line 68 to compensate for the delay introduced by phase adjuster 78.

Having now described in general terms, various overall embodiments of the invention, a more detailed description of the phase adjusters employed in FIGS. 1—3 will now be given. However, it is emphasized that a primary aspect of this invention lies in the employment of phase adjusters (regardless of the detailed structure of the adjusters) in overall systems such as illustrated in FIGS. 1—3, the adjusters utilizing closed-loop techniques. Phase adjustment can be effected in either of two ways. First, the phase of the signals can be adjusted by shifting them in time by the use of delay lines, the electrical length of which can be varied either by mechanical or electronic means. Second, the phase can be adjusted by rotating the phase of the desired signal as opposed to shifting the signal in time. Electronically variable delay lines are well known for accomplishing the particular function described in the embodiments of FIGS. 1—3. In particular these delay lines are responsive to the subcarrier and/or sync signals applied thereto to vary the phase of the composite color video signal applied thereto. In particular, these delay lines will effect a coarse adjustment of the phase of the composite signal in accordance with any phase deviation which might exist between the locally generated sync signal on line 48 and the sync signal of the picture signal. Further, in the embodiment of FIG. 3, the sync signal from sync comparator 86 has its phase compared with the phase of the sync signal of the video signal on line 66 in a phase comparator (not shown) within phase adjuster 78, the error signal from the phase comparator being employed to electronically vary the length of the delay line (not shown) of phase adjuster 78, the details of the adjuster 78 being well known to those of ordinary skill in this art as stated above. Also provided within these known electronically variable phase adjusters are means for respectively adjusting the phases of the locally generated sync and color subcarrier signals. Thus, the phases of the components of the composite signals respectively applied to terminals 80 and 82 of output circuit 70 may be adjusted with respect to each other over a desired range and in particular, the phases can be made to correspond to any predetermined phase relationship. With respect to the known electronic variable delay lines, it should also be noted that it is not necessary to utilize both the sync and color signals and in some applications the use of only the locally generated color subcarrier signals will be necessary to effect the desired phase relationships between the signals at terminals 80 and 82. If, for example, circuit 70 were either a mixing amplifier or special effects circuit, the phases of the color subcarrier portions of the picture signals at terminals 80 and 82 must be in phase. Thus, the control of the phase adjusters 74 and 76 by only the locally generated color subcarrier signal would be sufficient in such applications. The known electronically variable delay line, may also be employed as the phase adjusters 36—40 of FIG. 1 or phase adjuster 78 of FIG. 3.

Referring to FIG. 4, there is shown an embodiment of the phase adjuster which forms a further aspect of this invention. This phase adjuster is basically different from the known electronically variable delay lines, discussed above, in that the phase of the input signal thereto is rotated rather than shifted in time. The input signal is applied to terminal 100, this signal being a color picture signal. A band pass chroma filter 102 centered at 3.58 MHz extracts those frequencies falling within the band width occupied by the modulated color subcarrier signal. A comb filter 104 is responsive to filter 104. Filter 102 is so designed that the separation between the teeth is the line frequency and the teeth are so positioned as to extract the chrominance modulation subproducts which are centered between the luminance signal modulation subproducts. Thus, the output from comb filter 104 contains chrominance information only. This signal is applied over line 106 to a chrominance channel 108 and over line 110 to a subtractor 112. Also, applied to subtractor 112 is the composite signal via delay line 114, the purpose of which is to compensate for the delay introduced by the filters 102 and 104. The output from subtractor 112 is thus the luminance signal together with the timing information of the composite signal. This signal is applied to luminance channel 116.

The chrominance channel 108 has as its basic purpose the phase rotation of the extracted chrominance signal in order that the desired phase shift introduced by the phase adjuster may be effectuated. The phase shifted chrominance signal is present on line 118 where it is applied to adder 120. Also applied to adder 120 via delay line 122 is the luminance signal, the purpose of delay line 122 being to compensate for the delay introduced by chrominance channel 108. The output from adder 120 is the desired, phase-adjusted composite color signal which is applied to output terminal 124.

The manner for adjusting this phase will now be described with respect to chrominance channel 108, which includes mixer 126 to which is applied (1) the chrominance signal on line 106 and (2) a specially generated local carrier signal on line 128. This signal is derived from 3.58 MHz subcarrier source 130, which corresponds to the color subcarrier signal generated on line 50 from synchronizing signal generator 34 of FIG. 1. This color subcarrier signal is applied to a multiplier (X5) circuit 132 which produces the special local carrier signal on line 128, this signal having a frequency of approximately 17.9 MHz. The output from mixer 126 is applied to a band pass filter 134, the center frequency of which is approximately 14.32 MHz.

The special local carrier signal on line 128 is also applied to phase shifter 136. The amount of phase shift introduced by shifter 136 will be described in more detail hereinafter. Applied to mixer 138 are the outputs from filter 134 and shifter 136. The output of mixer 138 is applied to band pass filter 140, which has a center frequency of 3.58 MHz. Thus, the output from filter 140 is the same as the chrominance signal on line 106 except that it has been phase shifted by an amount determined by shifter 136.

The desired phase of the output signal occurring at terminal 124 is determined by the phase of the subcarrier signal generated by local source 130. The manner in which the phase of the source 130 signal controls the phase of the output signal from the adjuster will now be described. The source 130 signal is applied to a phase comparator 142. Also applied to comparator 142 is the color burst from the output composite color signal. This color burst is extracted by gate 144, which in turn, is gated at an appropriate time by gating signal source 146. Any phase difference between the extracted color burst and the color subcarrier source 130 will produce an error signal on line 148 which in turn causes the amount of phase shift introduced by shifter 136 to vary so that the error signal is reduced to zero. Thus, the phase of the color subcarrier portion of the composite color signal at terminal 126 will follow the phase of the locally generated subcarrier produced by source 130.

Figure 5:
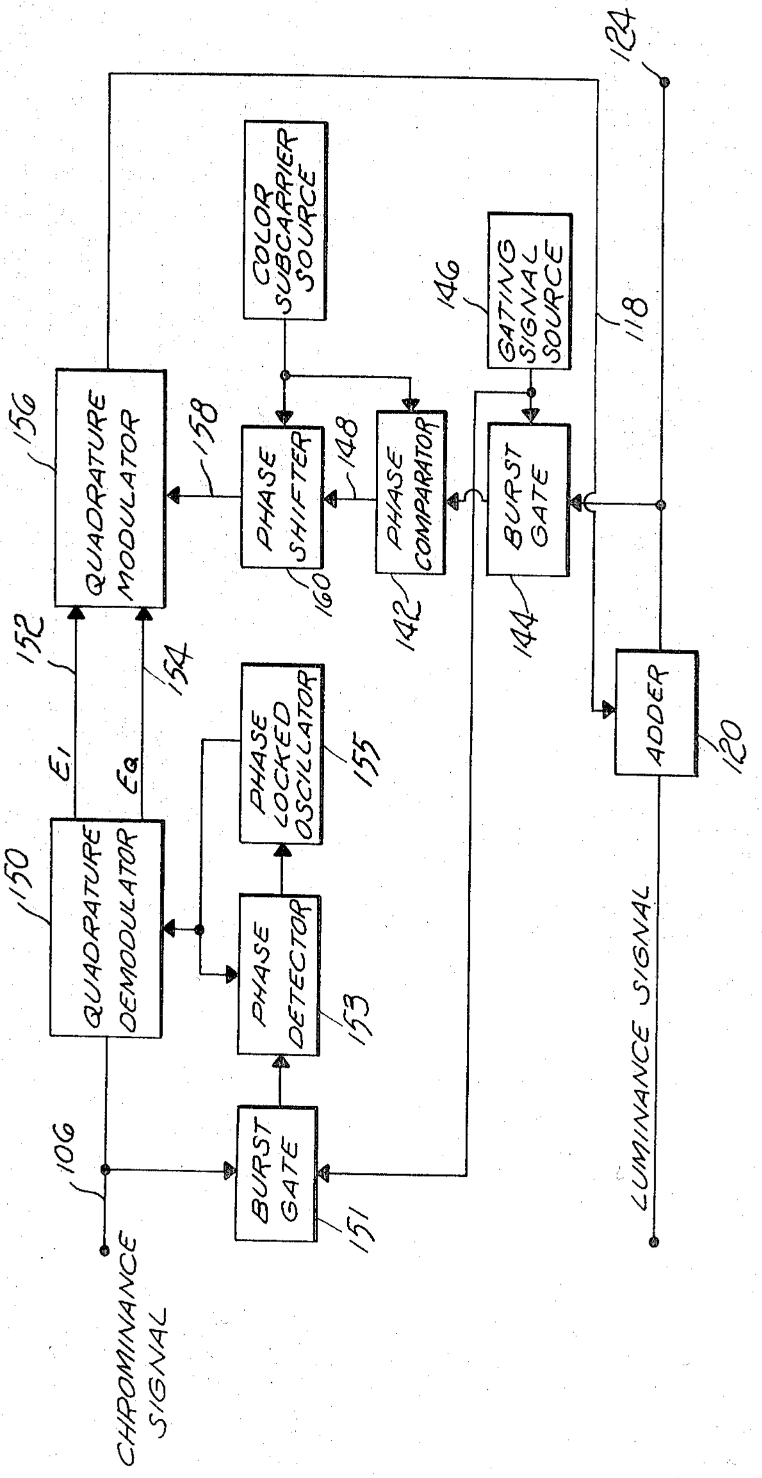
FIG. 5 is a block diagram of a modification of the FIG. 4 embodiment.

Reference should now be made to FIG. 5, which illustrates a modification of FIG. 4 insofar as the manner in which the extracted chrominance signal is phase shifted. The extracted chrominance signal is applied to a quadrature demodulator 150, of a well known type. Typically, this demodulator produces the $E_I$ and $E_Q$ signals on lines 152 and 154 respectively. These signals are those specified in the N.T.S.C. color signal specifications. However, it should be understood that demodulation can be chosen to occur on any other two quadrature axes.

The $E_I$ and $E_Q$ signals are applied to a modulator 156 to which is also applied over line 158 a color subcarrier, the phase of which is determined by phase shifter 160. The modulator 156 will typically produce at its output a signal in accordance with the N.T.S.C. chrominance waveform specifications. Thus, the modulated subcarrier signal on line 162 will be essentially the same as that on line 106 except for the shift in phase as introduced by phase shifter 160.

The input signal to phase shifter 160 is derived from subcarrier source 130. Thus, the phase of the color subcarrier of the composite output signal at terminal 124 will follow the phase of this locally generated subcarrier. It is, of course, to be understood that the source 130 of FIGS. 4 and 5 can also correspond to the oscillator 81 shown in FIG. 3.

The phase adjuster of FIGS. 4 or 5 may be used in any of the phase adjuster blocks shown in FIGS. 1—3. Further, coarse and fine phase adjustment may be obtained in any of the phase adjuster blocks of FIGS. 1—3 by employing (1) known electronically variable delay lines to obtain the coarse adjustment as discussed hereinbefore in series with (2) the phase adjusters of FIGS. 4 or 5 to obtain the fine adjustment. Thus, if the phase adjuster of FIG. 4 were employed to effect the fine phase adjustment, the terminals 100 and 124 would be respectively connected to line 66 and terminal 80 of the FIG. 3 embodiment while the color subcarrier source 130 of the FIG. 4 embodiment would correspond to the output from phase locked oscillator 81. Further, if the circuitry of FIG. 5 were employed in the phase adjuster of the FIG. 3 circuitry once again the color subcarrier source would correspond to the output from phase locked oscillator 81.

Numerous other modifications of the invention will become apparent to one of ordinary skill in the art upon reading the foregoing disclosure. During such a reading it will be evident that this invention provides unique television circuitry for accomplishing the objects and advantages herein stated. Still other objects and advantages and even further modifications will become apparent from this disclosure. It is to be understood, however, that the foregoing disclosure is to be considered exemplary and not limitative, the scope of the invention being defined by the following claims.

I claim:

1. Television circuitry for establishing a predetermined phase relationship between two picture signals, each said picture signal having at least one component, said circuitry comprising:
   - means for generating a reference signal from the one component of the first one of said two picture signals;
   - two paths respectively provided for said two picture signals; and
   - at least one phase adjusting means provided in one of said two paths, said phase adjusting means being responsive to the second one of said two picture signals and said reference signal wherever a phase deviation exists between the phase of said reference signal and the phase of the one component of the second picture signal to effect said predetermined phase relationship by making the phase of said one component of said second picture signal follow the phase of said reference signal.

2. Circuitry as in claim 1 including a switching matrix having a plurality of input and output lines and where said two paths correspond to two of said lines.

3. Circuitry as in claim 2 where said two phase adjusting means are respectively disposed in two of said plurality of output lines.

4. Circuitry as in claim 1 where said picture signals each include chrominance and luminance signal components and where each said phase adjusting means includes:
   - means for separating said chrominance signal component from said second picture signal;
   - means responsive to said separated chrominance signal and said second picture signal for removing the separated chrominance signal from said second picture signal to form said luminance signal;
   - means responsive to said separated chrominance signal and said reference signal for adjusting the phase of said separated chrominance signal; and
   - means for combining the phase-shifted separated chrominance signal and the luminance signal whereby the combined signal is the phase adjusted picture signal produced by said phase adjusting means.

5. Circuitry as in claim 4 where said reference signal is the reference color burst signal of said first picture signal and where said means for adjusting the phase of the separated chrominance signal includes;
   - means for multiplying the frequency of said reference signal;
   - means responsive to said frequency multiplied reference signal and said separated chrominance signal for modulating said separated signal to a higher frequency;
   - means responsive to any phase deviation between said reference signal and the color burst reference signal of said combined signal to shift the phase of the frequency multiplied reference signal so that its phase follows that of the reference signal; and
   - means responsive to the modulated signal and the phase-shifted, frequency multiplied reference signal for demodulating said modulated signal to the frequency of said separated chrominance signal whereby said separated signal is phase adjusted in accordance with the phase shift introduced by the phase shifting means.

6. Circuitry as in claim 4 where said means for adjusting the phase of the separated chrominance signal includes:
   - means for quadrature demodulating color signals from said separated chrominance signal component;
   - means responsive to any phase deviation between said reference signal and the color burst signal of the said combined signal to produce a phase-shifted, reference signal; and
   - means responsive to said phase-shifted, reference signal and said color signals for quadrature modulating said color signals onto said phase-shifted, reference signal to thereby effect the phase adjustment of said separated chrominance signal.

7. Circuitry for adjusting the phase of a picture signal including chrominance and luminance signal components and a color burst signal to thereby obtain a phase adjusted signal, said circuitry comprising:
   - means for separating said chrominance signal component from said picture signal;
   - means responsive to said chrominance signal and said picture signal for removing the chrominance signal component from the picture signal to form the luminance signal;
   - means for generating a reference color burst signal;
   - means responsive to said separated chrominance signal, the color burst of said phase adjusted signal, and said reference color burst signal for adjusting the phase of said separated chrominance signal so that it follows the phase of said color burst reference signal whenever a phase deviation occurs between said color burst reference signal and said color burst of said phase adjusted signal; and
   - means for combining the phase-shifted separated chrominance signal and the luminance signal whereby said combined signal is said phase adjusted signal.

8. Circuitry as in claim 7 where said means for adjusting the phase of the separated chrominance signal includes:
   - means for multiplying the frequency of said reference signal;
   - means responsive to the frequency multiplied reference signal and said separated chrominance signal for modulating said separated signal to a higher frequency;
   - means responsive to any phase deviation between said reference color burst signal and the color burst signal of the said phase adjusted signal to shift the phase of the frequency multiplied reference signal so that its phase follows that of the reference signal; and
   - means responsive to the modulated signal and the phase-shifted, frequency multiplied reference signal for demodulating said modulated signal to the frequency of said separated chrominance signal whereby said separated signal is phase adjusted in accordance with the phase shift introduced by the phase shifting means.

9. Circuitry as in claim 7 where said means for adjusting the phase of the separated chrominance signal includes:

means for quadrature demodulating color signals from said separated chrominance signal component;

means responsive to any phase deviation between said reference color burst signal and the color burst signal of the said combined signal to produce a phase shifted, reference signal; and means responsive to said phase-shifted, reference signal and said color signals for quadrature modulating said color signals onto said phase-shifted, reference signal to thereby effect the desired phase adjustment of said separated chrominance signal.